United States Patent

[11] 3,621,197

| [72] | Inventor | Donald E. Place<br>Mansfield, Ohio |
|---|---|---|
| [21] | Appl. No. | 81,029 |
| [22] | Filed | Oct. 15, 1970 |
| [45] | Patented | Nov. 16, 1971 |
| [73] | Assignee | Therm-O-Disc, Incorporated<br>Mansfield, Ohio |

[54] PROTECTOR SHIELDS FOR THERMOSTATS
6 Claims, 6 Drawing Figs.

[52] U.S. Cl.................................................. 219/328,
174/5 R, 174/138 F, 219/330
[51] Int. Cl................................................... F24h 1/00
[50] Field of Search........................................219/327–330,
310–312, 321; 174/5 R, 138 F, 66,
67; 211/26

[56] References Cited
UNITED STATES PATENTS
2,862,997 12/1958 Veitch et al. ................. 174/138 F
3,435,189 3/1969 Manecke..................... 219/330 X

*Primary Examiner*—C. L. Albritton
*Attorney*—McNenny, Farrington, Pearne & Gordon ABSTRACT: A protective shield for the terminals of thermostats mounted on water heaters is disclosed. The shield is formed of heavy fish paper shaped to provide access to the thermostat controls while preventing accidental contact with the terminals and connecting leads. Mounting portions are provided on the shield for removably mounting the shield in place.

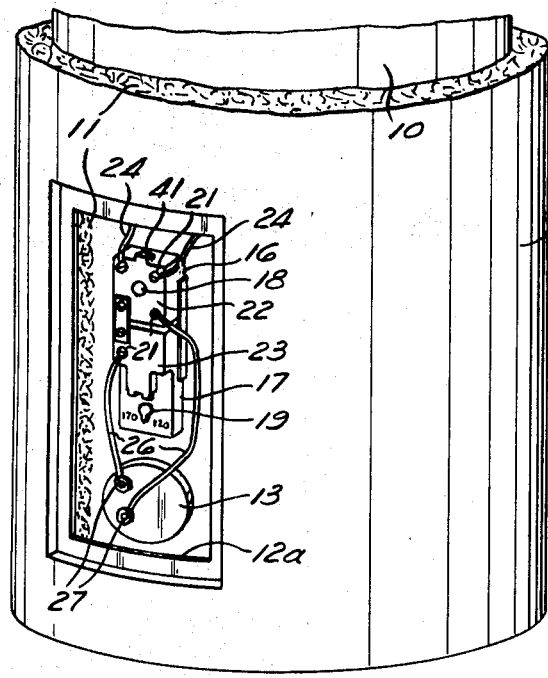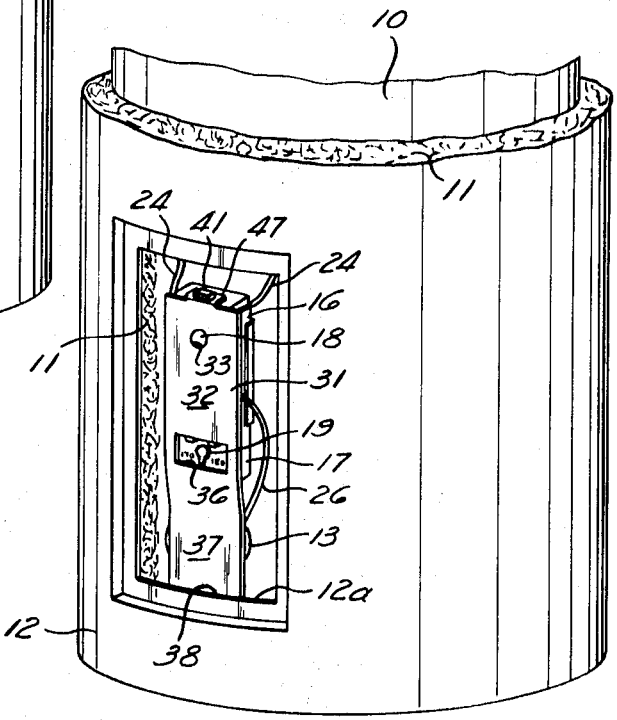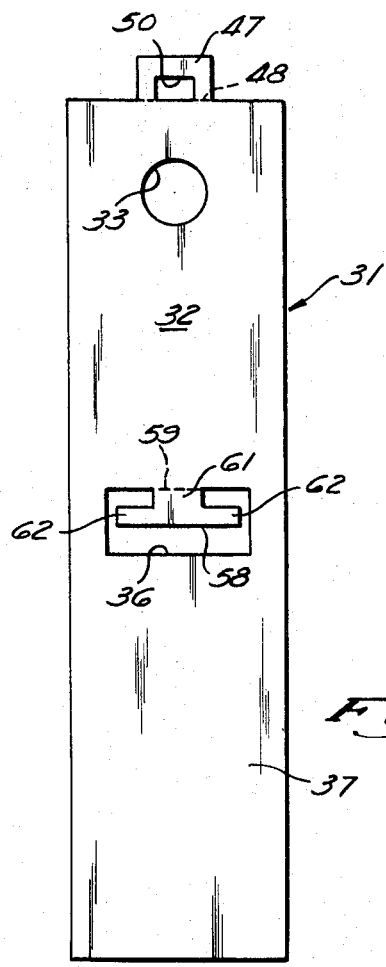

PATENTED NOV 16 1971 3,621,197

INVENTOR.
DONALD E. PLACE
BY
McNENNY, FARRINGTON, PEARNE & GORDON
ATTORNEYS

PROTECTOR SHIELDS FOR THERMOSTATS

BACKGROUND OF THE INVENTION

This invention relates generally to thermostatically controlled heaters or the like, and more particularly to a combination of a control thermostat assembly and a removable protective shield which prevents accidental contact with electrically charged terminals or the like. The invention in this application is related to the invention disclosed and claimed in the copending application of Edward G. Them and Bernard S. Deubel, Ser. No. 80,908 filed Oct. 15, 1970. Such application and the invention disclosed therein is assigned to the assignee of the present invention.

PRIOR ART

Automatic electric water heaters are provided with temperature sensing thermostats to control the operation of the resistance heaters. Generally, such water heaters include an inner tank in which the water is heated and stored, thermal insulating material around such tank, and an outer casing enclosing the tank and thermal insulating material. Usually, the thermostat is mounted against the inner tank in temperature sensing relationship therewith. An access opening is provided in the outer shell adjacent to the thermostat or thermostats which is normally closed by a removable cover so that access can be obtained to the thermostat for adjustment of the operating temperature of the thermostat. In most instances, a high limit thermostat of the manual reset type is also provided and access to such thermostat for resetting is also provided through the opening in the outer shell.

The thermostats are normally connected to the heaters and to the electrical supply by lead wires secured to terminals on the thermostat. Consequently, exposed wiring is located at a position substantially adjacent to the reset mechanism and the temperature adjusting mechanism. Because the exposed wiring is adjacent to the thermostat control mechanisms, there is a possibility of accidental contact with the exposed and charged wiring when the user either resets the thermostats or adjusts the operating temperatures thereof.

SUMMARY OF THE INVENTION

The present invention is directed to a combination of a thermostat having operating controls and exposed terminals substantially adjacent thereto and a removable protective shield which limits access to the exposed wiring while providing access for the control of the thermostat. Such protective shield therefore, prevents accidental contact with the exposed wiring, but is removable to permit access thereto when the thermostat must be serviced or replaced.

The illustrated embodiments of this invention include a pair of thermostats of the type used to control the operation of an automatic electric water heater. One of the thermostats in the illustrated embodiment is a manual reset high limit control thermostat and the other is a temperature controlling thermostat which is manually adjustable. A protective shield formed of heavy fish paper or the like, which is relatively stiff but can be bent to a limited extent, is removably mounted on the thermostat in a position to prevent accidental contact with the exposed terminals and connecting lead wires while still providing access to the two thermostats for resetting or temperature adjustment.

The thermostats are provided with opposed projections which extend in opposite directions and provides spaced surfaces facing in a direction opposite to the forward face of the thermostat assembly. In the particular embodiment illustrated, the manual reset thermostat is provided with a single projection at its end and the adjustable thermostat is provided with a pair of similar projections adjacent to the temperature controlling element. A first mounting portion on the protective shield extends around the projection on the manual reset thermostat and a second mounting portion extends between the projections on the adjustable thermostat. The two mounting portions operate to securely position the protective shield against the forward face of the thermostat and properly positions the shield so that openings formed therein provide access to the thermostat controls.

In the illustrated embodiments, the heater elements of the water heater are also provided with exposed terminals which are covered by the protective shield during normal use. The protective shield may be easily removed to provide access to the terminals in the event that repair or replacement of elements of the system are required. After service is completed, the protective shield is easily replaced and again functions to prevent accidental contact with exposed terminals or wiring.

BRIEF DESCRIPTION OF THE DRAWINGS

FIG. 1 is a fragmentary perspective view of a typical electric hot water heater illustrating the mounting of the thermostats thereon and the connection of the thermostats to the water heater element;

FIG. 2 is a view similar to FIG. 1 with the protective shield, in accordance with this invention, in place;

FIG. 3 is an enlarged view of the protective shield before installation;

DETAILED DESCRIPTION OF THE DRAWINGS

Figure 4:
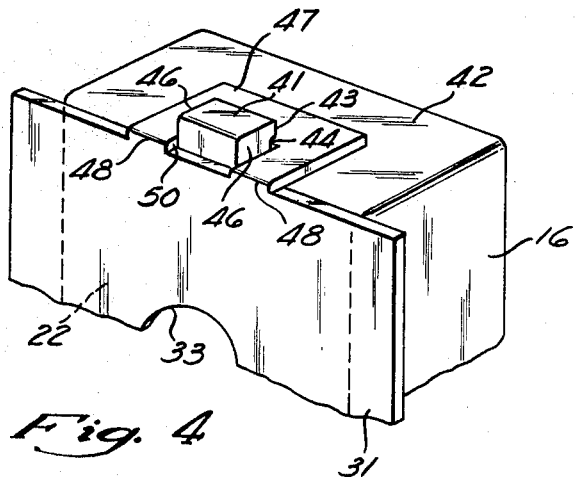
FIG. 4 is an enlarged fragmentary perspective view illustrating the upper mounting of the shield on the high limit thermostat.

Referring to FIGS. 1 and 2, a typical water heater includes an inner tank 10 surrounded by thermal insulation 11 which is, in turn, enclosed within an outer case 12. An access opening 12a is provided in the outer case and is normally closed by a removable cover (not illustrated). Mounted on the inner tank 10, within the access opening, are one or more resistance-type electric heaters 13 which operate to heat the water within the tank 10 when supplied with electrical power. Automatic temperature control is provided by a pair of thermostats 16 and 17. In the illustrated embodiment, the upper thermostat 16 is a high limit thermostat of the manual reset type, and the lower thermostat 17 is a temperature controlling thermostat. The high limit thermostat 16 does not operate under normal conditions, but opens to shut off the heater 13 whenever excessive temperatures are encountered. Such thermostat is of the manual reset type wherein the thermostat switch remains open until the thermostat is manually reset by pressing a reset button 18.

The lower thermostat 17 is the thermostat which automatically controls the operation of the heater 13 during the normal operation of the water heater. Such thermostat is manually adjusted to a desired temperature by turning an adjusting element 19. Once adjusted, the thermostat turns the heater 13 on and off to maintain the desired water temperature.

Each of the thermostats is provided with terminals 21 for connection to power leads. These terminals are in the forward faces 22 and 23 of the thermostats 16 and 17, so that they are easily accessible for connecting and disconnecting the leads during installation and servicing of the system. However, such terminals, since they are adjacent to the reset button 18 and the adjusting element 19, are susceptible to accidental contact when the thermostat 16 is reset or the thermostat 17 is adjusted. Two leads 24 connect the high limit thermostat 16 to a source of power and the leads 26 connect the thermostat assembly to the terminals 27 of the heater 13.

FIG. 2 illustrates the same electric water heater with a protective shield 31 in place. The protective shield is preferably formed of a relatively stiff sheet material which is electrically insulating in character such as 1/32-inch-thick fish paper. Such paper is sufficiently flexible, however, to permit the shield to be slipped into place and to be removed when necessary for servicing of the thermostats or heaters.

The shield includes a main body portion 32 formed with an opening 33 proportioned to provide access to the reset button 18. The main body portion is also formed with an opening 36 positioned over the adjusting element 19 and providing access thereto when the shield is in place. A downwardly projecting portion 37 extends over the heater 13 and is provided with an end which extends under the outer case 12 at 38.

The mounting of the shield 31 against the forward faces 22 and 23 of the thermostats is provided by projections on the thermostats and coacting mounting portions on the shield. Referring to FIG. 4, the high limit thermostat 16 is provided with an upwardly extending projection 41 extending from the end face 42. The projection 41 provides a bottom wall 43 facing in a direction opposite to the forward face 22 which is recessed at 44. The opposite sides 46 of the projection 41 extend substantially normal with respect to the end face 42 which, in turn, extends substantially normal to the forward face 22.

The shield 31 is provided with a tab or projection 47 formed with a central opening 50 proportioned to fit over the projection 41. The tab is connection to the main portion 32 by a hinge line 48 so that the tab can be bent down from the plane of the main portion 31 as illustrated in FIG. 4. Preferably, the hinge line is provided by scoring the material forming the shield at 48.

The tab 47 engages the recessed portion 44 of the projection 41 and is locked thereby to hold the shield against the forward face 22. The two sidewall surfaces 46 laterally position the shield with respect to the thermostat. Engagement between the tab and the end surface 42 prevents downward movement of the shield beyond the proper position for mounting.

Figure 5:
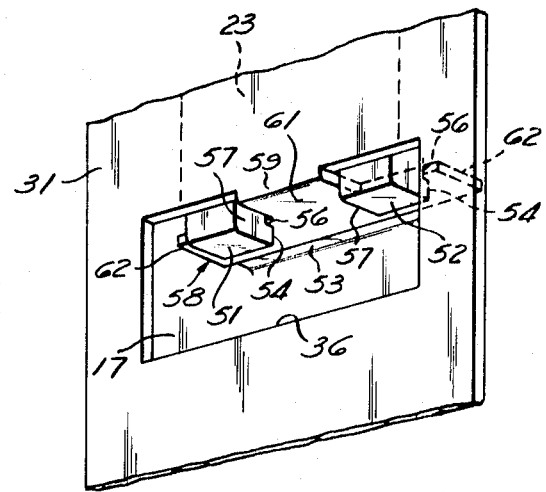
FIG. 5 is an enlarged fragmentary perspective view illustrating the mounting structure for securing the protective shield to the adjustable thermostat.

The mounting of the lower end of the shield against the thermostat 17 is illustrated in FIG. 5. This mounting includes a pair of projections 51 and 52 which extend at laterally spaced locations from the surface 53 in a direction opposite to the projection 41. The surface 53 extends normal to the forward face 23 of the thermostat 17 and faces in a direction opposite the end face 42 of the thermostat 16.

The two projections 51 and 52 provide rearwardly facing surfaces 54 which are recessed at 56 in a manner similar to the projection 41. The inner sides 57 of the two projections 51 and 52 face in opposite directions and extend substantially normal to the surface 53.

The shield 31 is provided with a mounting tab or portion 58 at the edge of the opening 36 which is bendable along a hinge line 59 back against the surface 53. Here again, the hinge line is preferably provided by scoring the shield at 59. The mounting tab 58 provides a shank portion 61 proportioned to fit between the two surfaces 57, and lateral projections 62 proportioned to fit into the recesses 56 in the rearward edge of the surfaces 54 of the projections 51 and 52. With this structure the projections 62 can be bent forward slightly as the shield is mounted in place to allow the tab 58 to be bent back into the mounting position.

The insulation of the shield 31 is as follows. The tab 47 is positioned over the tab projection 41 as illustrated in FIG. 4 and the lower end of the projection 37 is positioned under the edge of the case as illustrated in FIG. 2. The tab 58 is then bent back and the projections 62 are slipped behind the projections 51 and 52 as illustrated in FIG. 5. When the shield is to be removed, the tab 58 is pulled out and the shield is free to move upward to release the projection 61.

Because the tab 58 engages the surface 53 which faces in the opposite direction from the end face 42, the two tabs cooperate to prevent vertical movement of the shield with respect to the thermostat when the shield is mounted. Lateral positioning is, of course, provided by the engagement of the two tabs with their associated surfaces 46 and 57. Consequently, the two openings 33 and 36 are maintained in proper registry with the associated controls on the thermostats.

Figure 6:
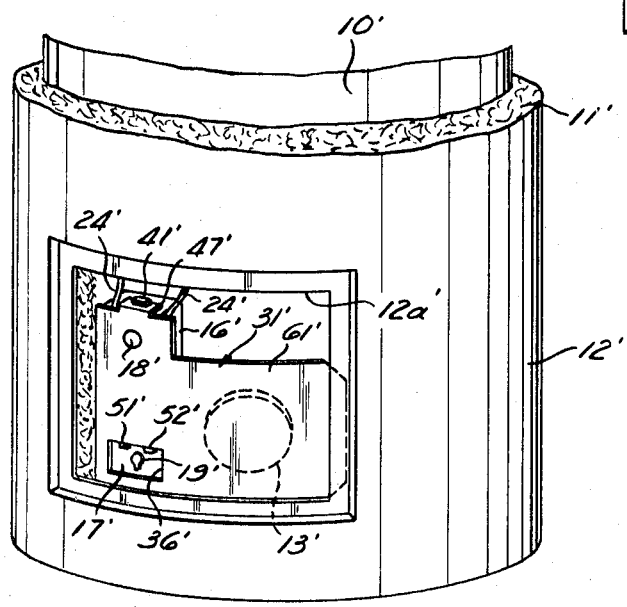
FIG. 6 is a fragmentary perspective view of an embodiment of this invention for use on water heaters wherein the resistance heater is located beside the thermostat assembly.

FIG. 6 illustrates a second embodiment of this invention wherein the physical arrangement of the mounting of the thermostats on the water heater is different than the embodiment illustrated in FIG. 1. In this second embodiment, similar reference numerals are utilized to designate similar parts with a prime (') added to indicate that reference is being made to the second embodiment.

The high limit thermostat 16' and the temperature controlling thermostat 17' are again mounted within the access opening 12a' in the outer case 12'. In this instance, however, the electric heater 13' is mounted on the inner tank 10' laterally to one side of the thermostats. The protective shield 31' is again formed with an upper mounting tab 47' proportioned to fit over the projection 41' on the thermostat 16', and a lower tab proportioned to fit between and under the two projections 51' and 52' on the thermostat 17'. The mounting of the shield against the thermostats is exactly the same as the first embodiment. However, in this instance, the shield is provided with a laterally extending projection 61' which extends over the heater 13' and under the outer case 12' at its end.

With a protective shield incorporating the present invention, a low cost device is provided which is easily installed to protect the user against accidental contact with the terminals and the connecting leads, while providing access for operation of the thermostats. The protective shield, however, is easily removed when access to the thermostats or heaters is required for servicing. After servicing, the shield is easily replaced. Since the shield is accurately located with respect to the thermostat, the access for controlling the operation of the thermostat is insured.

Although preferred embodiments of this invention are illustrated, it is to be understood that various modifications and rearrangements of parts may be resorted to without departing from the scope of the invention disclosed and claimed herein.

What is claimed is:

1. A temperature controlling system comprising a device having electrically controlled temperature changing means, thermostat means on said device having body means providing a forward face, control means on said forward face, said thermostat means also including terminal means accessible from said forward face and lead wires connecting some of said terminal means to said temperature changing means for controlling the operation thereof, said body means being formed with at least two spaced projection means providing spaced first surfaces facing in a direction opposite said forward face, said body means also providing second surfaces substantially adjacent to said first surfaces extending substantially normal to said forward face and a protective shield removably mounted against said forward face formed of a relatively stiff bendable electrical insulating material, said shield providing a portion covering said terminals and the connection thereof to said lead wires for limiting access thereto, opening means providing access to said control means, and mounting portions engaging said spaced first surfaces and associated second surfaces operating to removably secure said shield in a predetermined position against said forward face.

2. A temperature controlling system as set forth in claim 1 wherein said projecting means include opposed projections extending from said second surfaces providing third surfaces substantially normal to said second surfaces, and said mounting portions engage the associated third surfaces.

3. A temperature controlling system as set forth in claim 1 wherein said projection means include one projection extending from one of said second surfaces, and a pair of similar and spaced projections extending from another of said second surfaces in a direction opposite to the direction of said one projection, one of said mounting portions extending around said one projection, and another mounting portion extending between said similar projections.

4. A temperature controlling system as set forth in claim 1 wherein said device is an electric water heater, said temperature changing means is an electric resistance heater controlled by said thermostat means located substantially adjacent to said thermostat means, said resistance heater having a heater terminal connected to a lead wire, and said shield provides an extension extending over said heater terminal and limiting access thereto.

5. A temperature controlling system as set forth in claim 4 wherein said water heater is provided with an outer shell, and the end of said extension extends under said outer shell.

6. A temperature controlling system as set forth in claim 5 wherein said thermostat means includes an adjustable thermostat and a manual reset high limit thermostat, said control means includes temperature adjusting means on said adjustable thermostat and reset means on said high limit thermostat spaced from said adjusting means, and said opening means includes separate openings for said adjusting means and said reset means.

* * * * *